(12) United States Patent
Shiban

(10) Patent No.: US 8,910,438 B1
(45) Date of Patent: Dec. 16, 2014

(54) ABOVE GROUND TORNADO RESISTANT STRUCTURE FROM TIRE WALL BUILDING BLOCKS

(71) Applicant: Innovative Engineering Solutions, Inc., Chandler, AZ (US)

(72) Inventor: Samir S. Shiban, Chandler, AZ (US)

(73) Assignee: Innovative Engineering Solutions Inc., Chandler, AR (US)

( * ) Notice: Subject to any disclaimer, the term of this patent is extended or adjusted under 35 U.S.C. 154(b) by 0 days.

(21) Appl. No.: 14/063,139

(22) Filed: Oct. 25, 2013

Related U.S. Application Data

(63) Continuation-in-part of application No. 13/872,683, filed on Apr. 29, 2013.

(60) Provisional application No. 61/726,682, filed on Nov. 15, 2012.

(51) Int. Cl.
*E04B 1/12* (2006.01)
*E04H 9/14* (2006.01)
*E04B 1/92* (2006.01)
*E04B 5/08* (2006.01)
*E04B 1/74* (2006.01)

(52) U.S. Cl.
CPC .. *E04B 1/92* (2013.01); *E04H 9/14* (2013.01); *E04B 5/08* (2013.01); *E04B 2001/746* (2013.01); *Y10S 52/09* (2013.01)
USPC .............. 52/284; 52/292; 52/79.5; 52/DIG. 9

(58) Field of Classification Search
USPC ........... 52/70, 71, 79.5, 604, 284, 592.6, 292, 52/DIG. 9; 405/15, 16, 17
See application file for complete search history.

(56) References Cited

U.S. PATENT DOCUMENTS

| | | | | |
|---|---|---|---|---|
| 1,527,684 A * | 2/1925 | Hull | | 52/574 |
| 3,440,788 A * | 4/1969 | Merget | | 52/405.2 |
| 3,450,293 A * | 6/1969 | Goudeau et al. | | 220/4.28 |
| 4,031,678 A * | 6/1977 | Schuring | | 52/570 |
| 5,103,616 A * | 4/1992 | Nordberg | | 52/585.1 |
| 5,172,528 A * | 12/1992 | Clarke | | 52/198 |
| 5,214,897 A * | 6/1993 | Nordberg | | 52/585.1 |
| 5,507,127 A * | 4/1996 | Gates | | 52/605 |
| 5,675,956 A * | 10/1997 | Nevin | | 52/848 |
| 5,746,037 A * | 5/1998 | Nordberg | | 52/405.1 |
| 5,778,622 A * | 7/1998 | Baker | | 52/405.3 |
| 6,972,144 B2 * | 12/2005 | Roth et al. | | 428/68 |
| 7,137,758 B2 * | 11/2006 | Chou | | 405/284 |
| 7,546,712 B2 * | 6/2009 | Shaw | | 52/223.8 |
| 8,256,173 B2 * | 9/2012 | Sarkisian et al. | | 52/223.6 |
| 2010/0263300 A1 * | 10/2010 | Herron | | 52/79.5 |

\* cited by examiner

*Primary Examiner* — Robert Canfield
*Assistant Examiner* — Babajide Demuren
(74) *Attorney, Agent, or Firm* — James Creighton Wray

(57) ABSTRACT

Used tires are cut or shredded. Boxes are built. Vapor barriers are mounted in the boxes. Beams are fastened inside the boxes. Cut or shredded tires are added to the box. Force on a lid compresses the tires before the lid is fastened. Faces are offset to form linking tongues and grooves. Exposed portions are connected with fasteners to build walls and barriers. A tornado resistant structure based on the foregoing structural materials is formed to provide superior performance for resisting high winds over traditional framing methods or brick construction.

13 Claims, 5 Drawing Sheets

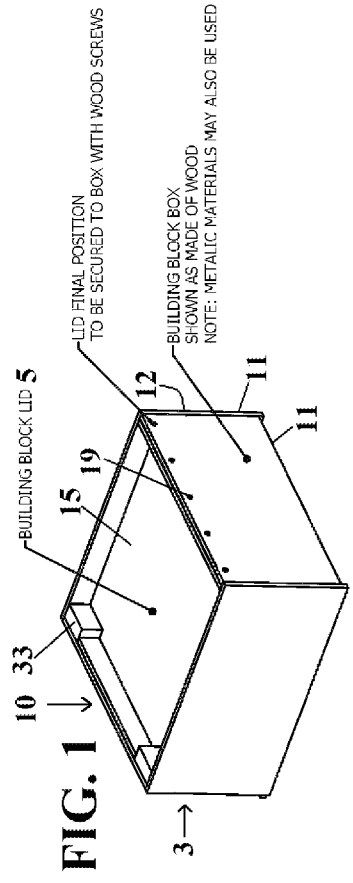

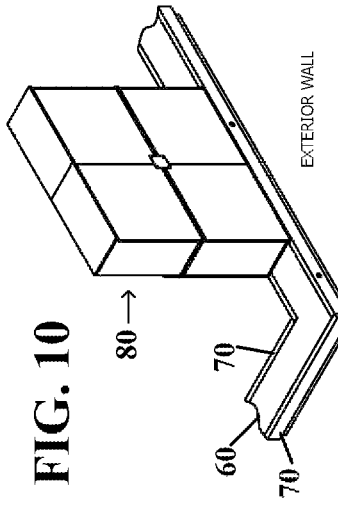
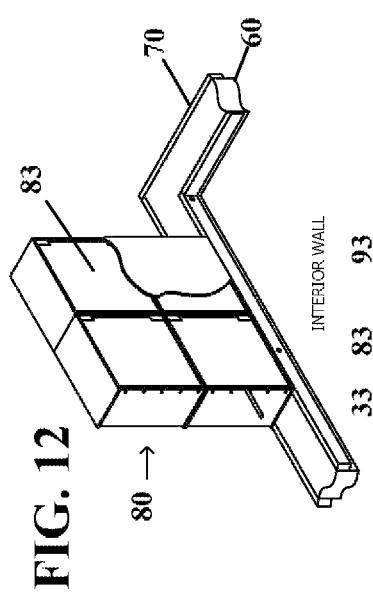
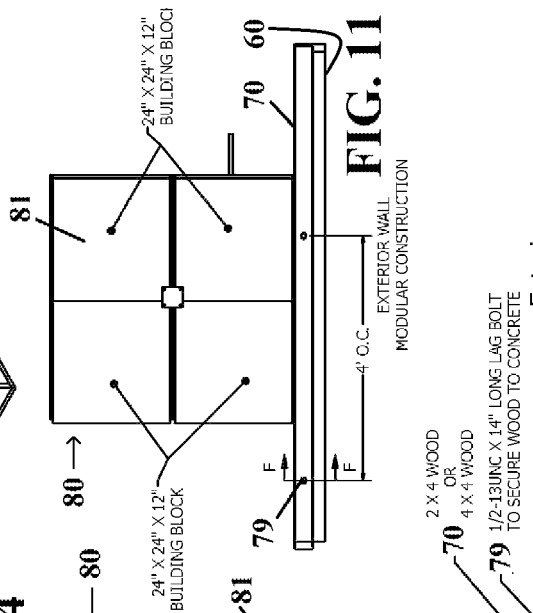
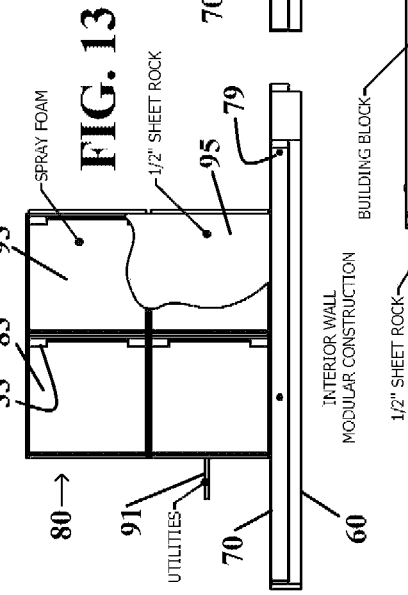
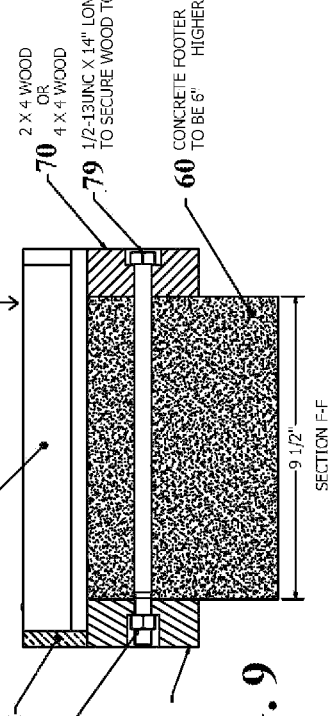

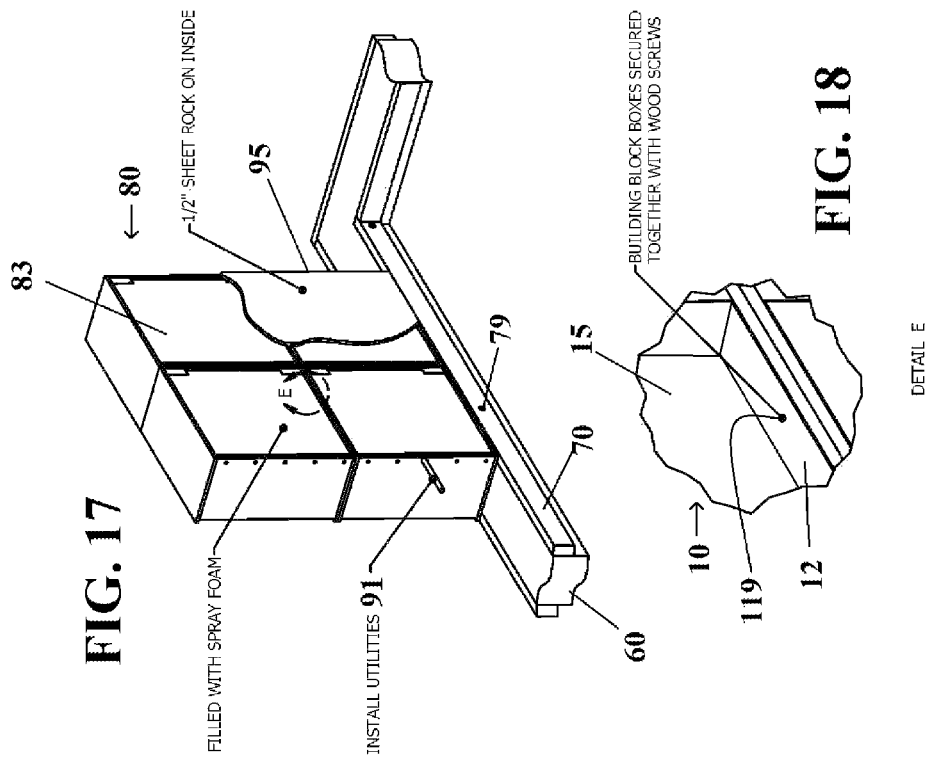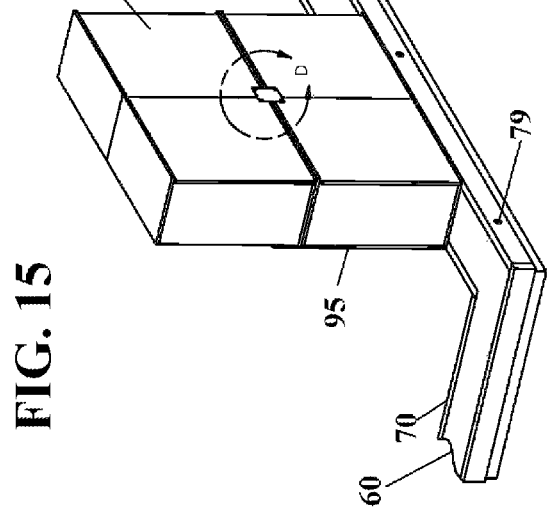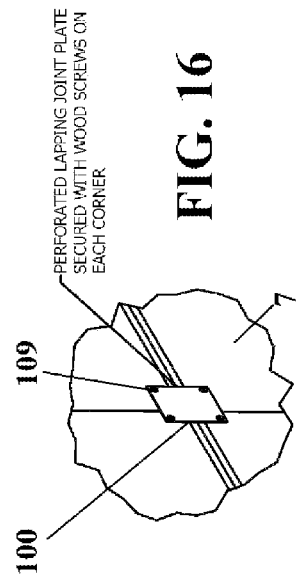

ABOVE GROUND TORNADO RESISTANT STRUCTURE FROM TIRE WALL BUILDING BLOCKS

This application is a continuation-in-part and claims the benefit of U.S. application Ser. No. 13/872,683, filed Apr. 29, 2013, which claimed the benefit of U.S. Provisional Application No. 61/726,682, filed Nov. 15, 2012, which are hereby incorporated by reference in their entirety as if fully set forth herein.

BACKGROUND OF THE INVENTION

Problems exist of accumulating piles of used tires having no value with little incentive to reduce the mass of waste.

Building materials are increasingly expensive. Insulation loses R value when wetted. Creating strong structures and strong building blocks with light materials has been impossible.

Need exists for strong inexpensive structural materials that have water resistance, ballistic resistance, mold and mildew resistance, and which provide insulation which remains effective even if wetted.

Need exists for an above ground tornado resistant structure based on the foregoing structural materials that provide superior performance for resisting high winds over traditional framing methods or brick construction.

SUMMARY OF THE INVENTION

The present invention provides strong inexpensive structural materials having water resistance and ballistic resistance, mold and mildew resistance, and which provide high R factors of insulation even when wet. The present invention further provides above ground tornado resistant structures based on the foregoing structural materials that provide superior performance for resisting high wind over traditional framing methods or brick construction.

Insulating panels have opposite plywood or oriented strand board (OSB) sides, and studs are arranged as a frame at edges. Parts of quartered, shredded, flaked, chopped or ground automobile and truck tires are flattened and compressed in an interior of plywood or OSB sides. Waterproof sheeting is folded under edges of the shredded tire treads and sidewall portions and along the opposite edge of the first plywood or OSB sheet before the second plywood or OSB lid or side is fastened to the surrounding studs to complete the insulated panel.

Pulverized used tires with adhesive mix such as polyurethane may be filled preformed sections in walls and ceilings as insulation against heat transfer or sound conduction.

The panels may also be filled with flaked, chopped or ground used tire bits. Loose fibers may be interposed with the ground tire bits to lighten the panels.

Five-panel boxes are formed from ½ inch thick exterior plywood, OSB, metal or plastic panels. A vapor barrier is placed on one panel and pressed and folded along adjacent interior surfaces. Inside corners of the boxes are reinforced with 2×4's or square tubes or extruded shapes. The box is substantially filled with shredded or other forms of waste tire parts or particles. A lid is placed to complete the box. Force is applied to the lid to compress the tire parts, and the lid is secured to the box to form a block. Tongues are extended from panels to fit in grooves of adjacent boxes when the blocks are stacked and juxtaposed.

Edge portions of side walls of the boxes remain exposed as the lids are pressed inward to compress the tire parts. For fences, barriers, shields or building walls the extended edge portions of adjacent boxes are joined by fasteners. The extended edge portions of the boxes provide voids in inner surfaces of the blocks in which utilities may be mounted. Foam fills the voids, and interior walls such as sheet rock are mounted on edges of the extended side wall edge portions.

The structural exterior walls are formed by aligned outer surfaces of the boxes. At the four corners of adjacent boxes, bridging plates are mounted. Screws extend through the plates and the exterior walls and into the internal beams that support the blocks.

The assembled blocks are useful as barrier walls, fences and protective shields, as well as building walls and panels.

These and further and other objects and features of the invention are apparent in the disclosure, which includes the above and ongoing written specification, with the claims and the drawings.

BRIEF DESCRIPTION OF THE DRAWINGS

FIG. 1 is a perspective view of a building block.

FIG. 2 is an exploded view of the block shown in FIG. 1.

FIG. 3 is a side elevation of the block shown in FIG. 1.

FIG. 4 is a cross-sectional view taken along line A-A of FIG. 3.

FIG. 5 is a detail of a corner taken at B of FIG. 4.

FIG. 6 is a detail of a corner taken at C of FIG. 4.

FIG. 7 shows the block box with the felt vapor barrier in place and a vertical beam and horizontal beams.

FIG. 8 is a detail of the block lid.

FIG. 9 is a detail of a footer with wood beams on opposite sides of the top, a lag bolt extending through the beams and footer and a block building wall on top of the footer.

FIG. 10 is a detail of a footer, wood beams and building exterior wall portion.

FIG. 11 is a front view of the footer, wood beam and building exterior wall shown in FIG. 10.

FIG. 12 is a detail of a footer wood beams and building interior wall portion.

FIG. 13 is an inside elevation of the footer, wood beam, blocks assembled in a partial wall showing utilities in voids, spray foam filling voids and interior sheet rock.

FIG. 14 is a side view of the footer and building wall portion shown in FIGS. 9-13.

FIG. 15 is an enlarged view of FIG. 10.

FIG. 16 is a detail of FIG. 15 showing the lapping joint plate fastened to corners of the blocks with wood screws extending through the plate, through the block outer walls and into the interior vertical beams and into ends of the horizontal beams.

FIG. 17 is an enlarged view of FIG. 12.

FIG. 18 is a detail of FIG. 17 showing inward extending sides of the building blocks joined by fasteners.

DETAILED DESCRIPTION

Figure 19:
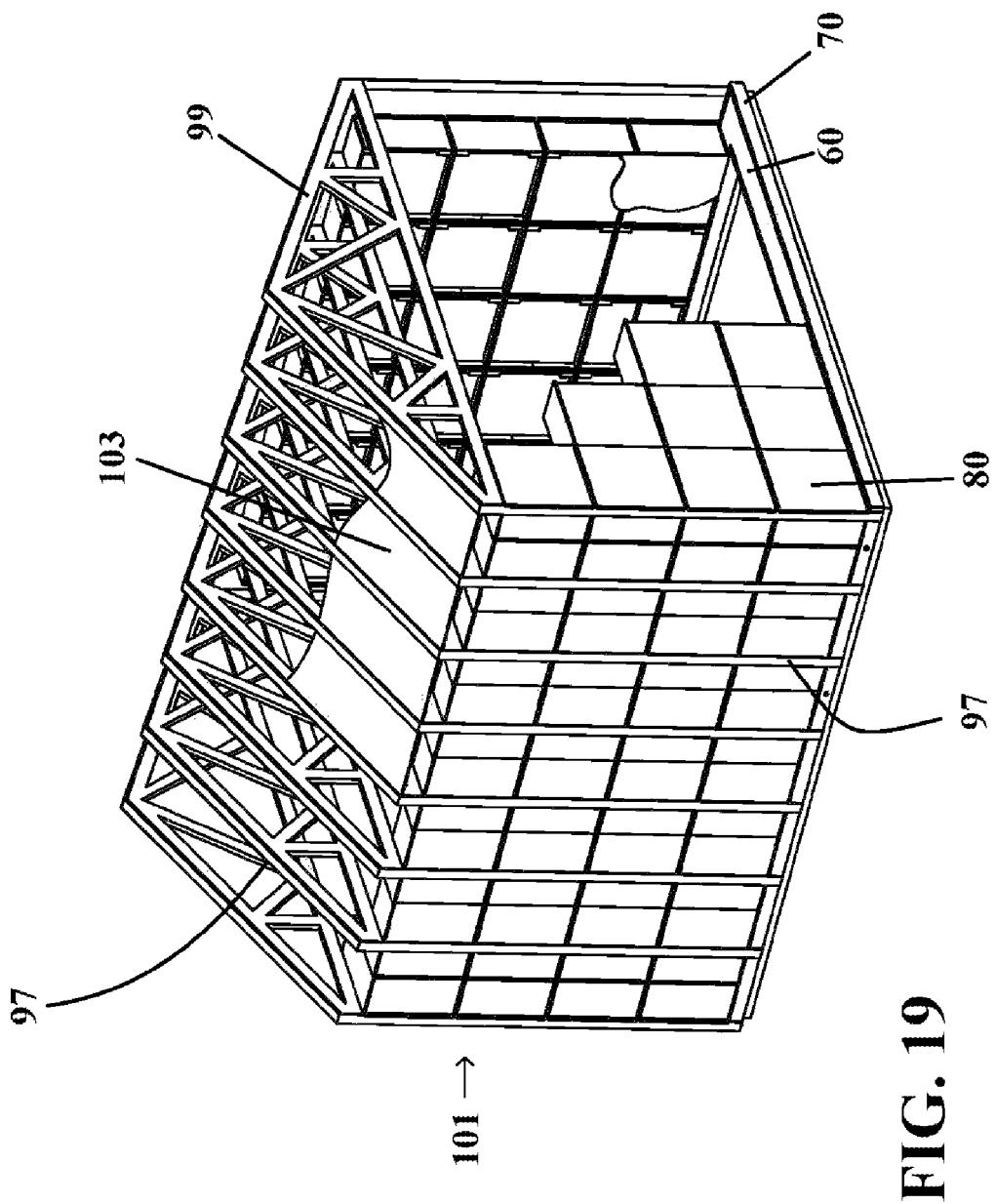
FIG. 19 is a building formed from concrete foundation, building blocks, roof trusses, and roof secured by straps.

FIG. 1 is a perspective view of a building block 10 formed of a box 3 and a lid 5. The secured block has sides 11 and an inner surface 15 formed by a lid 5 with flanges 17 secured to edge portions 12 of side 11 with screws 19.

FIG. 2 is an exploded view of the block 10 shown in FIG. 1. Lid 5 has recesses 16 which receive ends of internal beams 33. Shredded tires 20 are placed in box 3. Lid 5 is positioned with a force 21 of about 2 to 3 psi for compressing the shredded tires 20.

FIG. 3 is a side elevation of the block 10 shown in FIG. 1 showing sides 11, fastener screws 19 and outer wall 7.

FIG. 4 is a cross-sectional view taken along line A-A of FIG. 3. An internal beam 31 is shown within the compressed shredded tires 23. Outer wall 7 is offset to form a tongue 53 and a groove 55. A felt vapor barrier 50 is shown inside the wall 7.

FIGS. 5 and 6 are details of corners taken at B and C of FIG. 4. Outer wall 7 is offset for form an overhang or tongue 53 and for an overlap in groove 55 in adjacent blocks.

As shown in FIGS. 5 and 6, vapor barrier 50 has a flat portion 57 against an inside of wall 7 and upward side portions 51 along sides 11.

FIG. 7 shows the block box 3 with the felt vapor barrier 50 in place and a vertical beam 31 and horizontal beams 33 before box 3 is filled with shredded tires 20.

FIG. 8 is a detail of the block lid 5 showing recesses 16 and flanges 17.

FIG. 9 is a detail of a footer 60 with wood beams 70 on opposite sides of the top, a lag bolt 79 extending through the beams 70 and footer 60. A partially built block building wall 80 is mounted on top of the footer 60.

FIG. 10 is a detail of a footer 60, wood beams 70 and an outer side 81 of building exterior wall portion 80.

FIG. 11 is a front view of the footer 60, wood beam 70 and building exterior wall 80 shown in FIG. 10.

FIG. 12 is a detail of a footer 60, wood beams 70 and building interior wall portion 83. FIG. 12 shows the inner surfaces 15 with side extensions 12 and utilities 91 which are placed before foam 93 and sheet rock 95 are added.

FIG. 13 is an inside elevation of the footer 60, wood beam 70, blocks assembled in a partial wall 80 showing utilities 91 in voids 92, spray foam 93 filling voids and interior sheet rock 95 fastened to edges of the sides.

FIG. 14 is a side view of the footer 60 and building wall portion 80 shown in FIGS. 9-13. Outer walls 7 of blocks 10 form the outer wall of the building wall 80. Sheet rock 95 is shown forming the inner wall FIG. 15 is an enlarged view of FIG. 10 showing footer 60, wood beams 70 and lag bolts 79 reinforcing the footer 60. Blocks 10 form the building wall 80.

FIG. 16 is a detail of FIG. 15 showing the lapping joint plate 100 fastened to corners of the blocks with wood screws 109 extending through the plate 100 and through the block outer walls 7 and into the interior vertical beams 31 and into ends of the horizontal beams 33.

FIG. 17 is an enlarged view of FIG. 12 showing the voids 12 filled with cut or sprayed foam 93 and covered by sheet rock 95 after utilities 91 are installed through the voids 12.

FIG. 18 is a detail of FIG. 17 showing inward extending side portions 12 of the building blocks 10 joined by fasteners 119, which may be wood screws.

The boxed 3 and lid 5 are formed of exterior grade ½ inch plywood. A vapor barrier 50 is placed in each box against an inside of outer wall 7 and creased and folded against outer portions of sides 11. Shredded tires are filled to beyond the widths of flanges 17 so that the flanges extend from the box. A uniform force of about 2-3 psi on the lid 5 compresses the shredded tires 20 into a compressed mass 23. Fasteners 19 fix the flanges 17 to the sides 11 with even edges.

The boxes may be used in the sides of ship hulls in security dividers, sound barriers and in fences, as well as in walls and panels for buildings.

The blades have ballistic resilience. Bullets are not able to penetrate blocks with eight inches of thickness.

The exterior plywood and structural beams may be replaced by aluminum or sheet metal. Fastening may be by welding. Structural beams may be metal square tubes or extruded shapes or plastic tubes or shapes. The wall structures of the invention are used where heat transfer insulation, impact and water resistant structures and sound barriers are desired. The shredded tires resist mold and mildew and remain fully insulating if wet.

Ordinary insulation is shrunk by water and loses insulating properties after becoming wet.

The present invention provides high quality, high R value, lower cost building material blocks by efficiently using waste tire materials and available materials to make boxes and lids and strengthening beams, resulting in reduction of moisture damage, mold and mildew when constructing strong structures.

Figure 20:
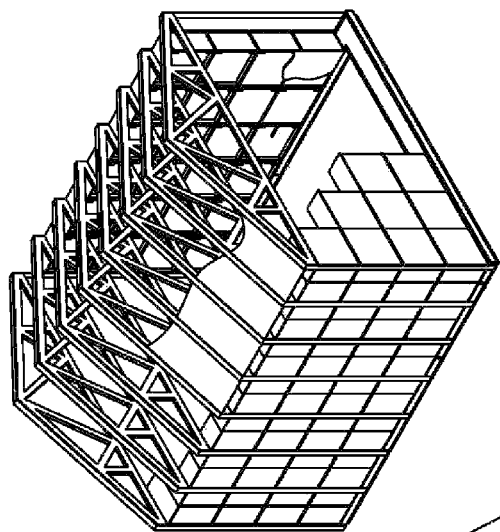
Figure 22:
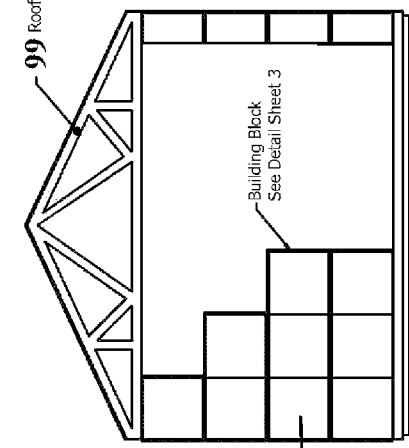
FIG. 22 is a side view of the building shown in FIG. 19.
Figure 21:
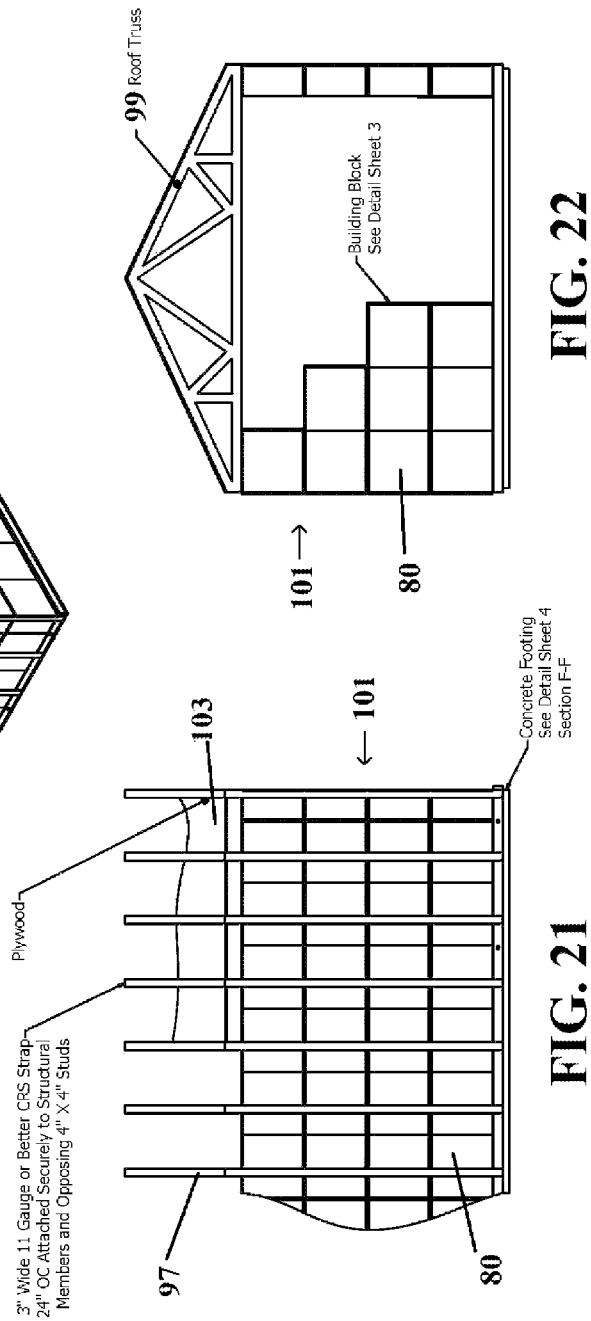
FIG. 21 is a second view of the building shown in FIG. 19.

Exterior walls of the building will consist mainly of shredded rubber filled building blocks 10 as detailed in FIGS. 19-21. Shredded rubber provides substantial weight to weigh down the structure to increase resistance to wind. The weight per cubic foot of shredded rubber is on the order of magnitude higher than that of fiberglass insulation therefore providing substantial more robust, stable and heavy exterior walls.

The building blocks 10 will be arranged so that they are securely attached to the foundation, wherein the foundation can be the footer 60 and the beams 70 shown in FIGS. 9-14. As previously discussed, the building blocks 10 overlap and attach securely to each other. The sheet metal straps 97, as shown in FIGS. 19-21, are installed so the building blocks 10 forming building wall 80 will be secured to concrete via vertical 11 gauge carbon steel straps or better. The straps 97 secure the building blocks 10 together and to the concrete foundation on the bottom via 4×4 wood studs or wood beams 70 that are anchored to the concrete footer 60 by lag bolts 79. The straps 97 will also secure the roof trusses 99 and/or roof 103 to the building foundation. The roof trusses 99, building blocks 10 and concrete foundation will then finally form one continuous connected and extremely heavy exterior structure of the building 101.

Depending on size of building, there could be 50 tons or more of recycled tires used in filling the building blocks. It is noteworthy that the use of shredded tires provides environmental benefits by removing tire piles from the landscape. The cost of shredded tires is approximately $30.00 per ton. Also, synthetic rubber has heat resistant and bullet resistant properties.

The building blocks will be built primarily of plywood and lumber and filled with pressed ¼" shredded recycled tires. The exterior of the building will be first secured by continuous 3" wide 12 or 11 gauge carbon steel straps, or better, arranged vertically 24" on center as described in the drawings. Horizontal straps, similar to vertical straps, can be arranged 8' on center to reinforce the horizontal movement. Siding will be made of fire resistive coating such as stucco or aluminum. The interior of the exterior walls of the building shall have a cavity of about 2" for installation of utilities and electric wiring. The cavity will be filled with fire rated spray foam insulation before adding sheet rock. Structures based on this system are thought to provide superior performance for resisting high wind than traditional framing methods or brick construction.

While the invention has been described with reference to specific embodiments, modifications and variations of the invention may be constructed without departing from the scope of the invention, which is defined in the following claims.

I claim:

1. Apparatus comprising:
a building block having
shredded tires surrounded by
a plywood or oriented strand board shell;
wherein the shell further comprises an outer wall,
an inner surface, and
sides connected to the outer wall and inner surface;
wherein the building block is assembled into a building wall of similar building blocks with a tongue in groove construction and with at least two horizontal beams of one block near at least one vertical beam of an adjacent block, and further comprising lapping joint plates connected at corners of the front edges of the blocks and fasteners extending through the plates and the outer walls into the beams;
further comprising concrete footers beneath the building walls, wherein sheet metal straps are installed such that the building blocks forming the building wall are secured to concrete footers by the sheet metal straps.

2. The apparatus of claim 1, wherein the shredded tires comprise compressed shredded tires.

3. The apparatus of claim 1, wherein the shell further comprises a vapor barrier inside the outer wall and extending inward along the sides.

4. The apparatus of claim 1, further comprising outward extending flanges on opposite edges of the inner surface with a shorter flange extending between the two recesses and a longer flange on an edge of the inner surface opposite the shorter flange, and fasteners connecting the flanges and the walls and ends of horizontal beams.

5. The apparatus of claim 1, wherein the outer wall is displaced longitudinally and a first edge portion of the outer wall is extended outward beyond edges of a first side forming a tongue, and a second opposite edge portion of the outer wall is spaced inward from an edge of a side opposite the first side forming a complementary groove.

6. The apparatus of claim 1, further comprising utilities installed through the walls in spaces between the inner surface and edges of the walls.

7. The apparatus of claim 1, further comprising wooden beams on opposite side of the upper portions of the footers, wherein the wooden beams are attached to the footers by lag bolts through the wooden beams and the footers.

8. The apparatus of claim 7, wherein the sheet metal straps secure roof trusses above the building wall to the building footers that form a foundation.

9. The apparatus of claim 8, wherein the sheet metal straps are vertically attached to the concrete footers.

10. The apparatus of claim 9, further comprising horizontal straps that secure adjacent building blocks forming the building wall from horizontal movement.

11. The apparatus of claim 1, wherein the sheet metal straps further secure a roof above roof trusses, and wherein the roof trusses, building blocks and concrete footers form one continuous connected exterior structure.

12. The apparatus of claim 1, wherein the lapping joint plates comprise a plywood sheet of the shell displaced partially inward along part of the at least one vertical beam, thereby forming a groove, and wherein the plywood sheet is displaced outward from along ends of the at least two horizontal beams, thereby forming a tongue for fitting in a groove of an adjacent building block.

13. The apparatus of claim 1, wherein the shell further comprises five panels as sides and a lid, wherein the lid has at least two recesses, which recesses receive ends of the at least two horizontal beams and the lid has at least two opposite flanges fastened to the shell.

\* \* \* \* \*